(12) United States Patent
Colby

(10) Patent No.: US 6,584,850 B2
(45) Date of Patent: Jul. 1, 2003

(54) UNIVERSAL REGULATOR TESTER

(76) Inventor: Daniel H. Colby, 509 Landmeier Rd., Elk Grove Village, IL (US) 60007

( * ) Notice: Subject to any disclaimer, the term of this patent is extended or adjusted under 35 U.S.C. 154(b) by 0 days.

(21) Appl. No.: 09/899,417

(22) Filed: Jul. 5, 2001

(65) Prior Publication Data

US 2002/0046610 A1 Apr. 25, 2002

Related U.S. Application Data

(60) Provisional application No. 60/216,269, filed on Jul. 6, 2000.

(51) Int. Cl.$^7$ .................................................. G01L 7/00
(52) U.S. Cl. ........................................... 73/700; 73/756
(58) Field of Search .......................... 73/756, 700, 798, 73/1.05, 1.25, 1.72

(56) References Cited

U.S. PATENT DOCUMENTS 6,032,537 A * 3/2000 McLaren ..................... 73/756

* cited by examiner

Primary Examiner—Max Noori
Assistant Examiner—Alandra N. Ellington

(57) ABSTRACT

A universal regulator tester is disclosed wherein a bleed valve is used to exhaust pressurized gas through an exhaust passage that is designed and configured to simulate the pneumatic action of an actuation of a marker. The universal regulator tester can be used to test apparatuses with pressures up to 1200 PSI and can be used on pneumatic paintball guns, markers and similar devices.

1 Claim, 1 Drawing Sheet

UNIVERSAL REGULATOR TESTER

This application claims the benefit of Provisional application Ser. No. 60/216,269, filed Jul. 6, 2000.

TECHNICAL FIELD OF THE INVENTION

The present invention relates to a pneumatic tester of air systems, i.e., for testing the output delivery pressure of regulators, etc., and more particularly, the present invention relates to a universal regulator tester for testing pneumatic valves and regulators either connected to a pressure vessel or those, which stand-alone.

BACKGROUND OF THE INVENTION

In recent years, as the popularity of paintball games has grown, there has been a proliferation of different types of paintball guns, air guns or markers, and the devices that are used in conjunction with these markers. These new markers and related devices have become necessary due to the increased level of play as users of these markers improve and hone their skills.

The early types of markers and related devices provided an adequate level of play. However, the onset of more experienced players, along with challenging paintball gun tournaments, now provides an arena where better markers and peripherals are required to sufficiently compete.

As such, there is a great need for an apparatus that can test the air systems of these devices. The recent demand for both increased safety and peak performance within the paintball industry has created a need for a pneumatic tester to accurately tune and maintain equipment at the cutting edge.

As such, a need exists for a device that allows a player to test certain capabilities of a marker and air system before, during, and after competitions and tournaments. Some of these capabilities include the ability to adjust and test the output pressure level, or muzzle velocities for marker systems as the input pressure decays.

Further, a need exists to be able to perform different diagnostic tests that simulate the marker system in question. Satisfaction of such a need would allow a player to become familiar with how the marker system will perform under various conditions.

Moreover, many players utilize marker systems that utilize many different components produced by many different manufacturers. A need exists for players in the paintball industry to universally test their respective systems that are being used, regardless of the manufacturers of the marker system or components.

SUMMARY OF THE INVENTION

The present invention is an apparatus for testing pneumatic valves and regulators either connected to a pressure vessel or those which stand alone. Due to the recent demands for both increased safety and peak performance within the paintball industry, individuals have been forced to accurately tune and maintain their equipment at the cutting edge.

The tester of the present invention, known as a Guardian, allows the individual to simulate a marker connected to an air system. The Guardian's passages and internal chamber have been calculated to emulate the internal spacing most commonly found in the majority of markers within the industry today. This creates a system that can most accurately recreate the action of a regulator or pneumatic valve used in conjunction with the sport of paintball.

The Guardian is equipped with a low-pressure safety device that will prevent harm being done to the user if there is a malfunction in the system being tested. It is equipped with a rotary bleed valve that makes the unit easy to use with one hand, enabling the user to securely hold onto the system being tested with his free hand. The unit's heavy external knurling maintains this single handed ability even under the most severe conditions. The rotary bleed valve redirects discharge air alongside the tester to prevent dirt, debris and foreign material from impeding or injuring the user. The tester is equipped with a large 180-degree sweep gauge for quick easy reading.

Through the use of adapters, the Guardian tester can examine and service a variety of systems not limited to the paintball industry. The tester is equipped with an industry standard CGA 320 female thread in its main body for testing secondary regulators and pneumatic valves. It also comes equipped with an adapter that has a CGA 320 male thread and ⅛-27 N.P.T. female port for testing systems that utilize a line or hose assembly connecting it to the pressure vessel.

A standard valve pin and seat, such as that produced by Air America, have been used in the configuration of the tester to allow the user to repair or rebuild the unit while in the field with common parts if the need arises.

When using the system, the Guardian is first securely connected to the unit needing test (primary or secondary regulator). For most secondary regulators the unit is screwed into the Guardian's female CGA 320 port. The rotary bleed valve is closed completely seating the regulator pin onto the seat.

Air pressure is allowed to enter the tester through either the adapter or the CGA 320 fitting. Upon the air entering the main body, it in turn simultaneously applies pressure to the safety port and safety, along with the port that contains the pressure gauge. This causes the pressure gauge to read system pressure and allows the user to adjust the pressure of his system if he so wishes.

Pressure is maintained within the main body by sealing its escape past the pin and seat. Based upon the reading on the gauge and its actions, different diagnostic evaluations could be made. Air can be released from the tester by opening the rotary bleed valve, which allows air to pass over the pin and seat and exit through passages of a predetermined size and length creating a marker discharge simulation.

Based on the actions of the gauge, diagnostic evaluations can once again be made on the condition of the system being tested and its overall condition and performance. Air leaving the tester exits its bleed passages and is directed downward, by the design and contour of the rotary bleed valve, along the sides of the tester to prevent harm to the user or surrounding individuals.

To stop the flow of pressurized air the user simply rotates the rotary bleed valve in the opposite direction. To simulate the cycling of a marker's rate of fire, the user can simply open and close the valve rhythmically to emulate the marker's cycle rate; diagnostic reading can once again be taken to make determinations upon the system's condition.

For testing primary systems, the use of the adapter with the CGA 320 male thread is needed to be utilized as an interface between the system being tested and the tester. The adapter allows for a variety of different primary system configurations to be attached to the Guardian tester. The interface (fitting) on the adapter can also be changed to be compatible with the fittings utilized with other manufacturers' air systems, making the Guardian a true universal tester.

DETAILED DESCRIPTION OF THE PREFERRED EMBODIMENTS

Figure 1:
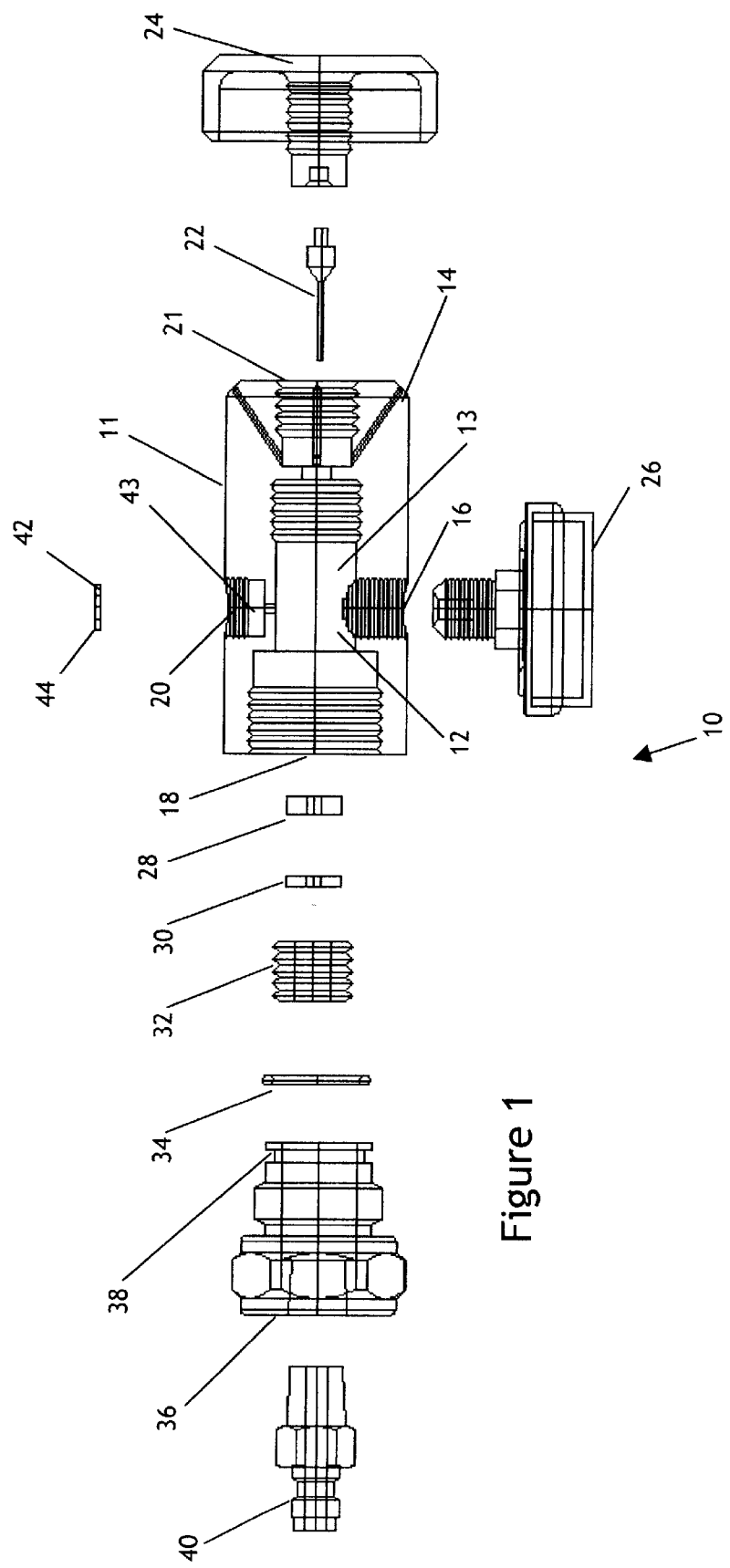
FIG. 1 is an exploded sectional view of a universal regulator tester for use in testing a regulator for markers in accordance with the present invention.

The present invention is universal regulator tester designed to accurately test marker systems with output pressures up to 1,200 PSI. The present invention is compatible with virtually all of the paintball guns or markers currently used in the sport of Paintball. The preferred embodiment of the present invention incorporates a high-pressure safety device, a precision pressure gauge, a precise bleed valve pin, valve adjustment, an exhaust passage, and a connecting port and an adapter for connecting the present invention to various marker systems to be tested.

FIG. 1 shows an exploded sectional view of the universal regulator tester 10 in accordance with the present invention. As will be described in detail herein, the universal regulator tester 10 consists of a main body 11 having an internal chamber 12 with four passages and an internal chamber. In the preferred embodiment, the main body 11 is precision machined and made from 7075 T651 aluminum, although other high strength materials such as stainless steel and other aluminum alloys can be used in the manufacture of the device. The main body 11 can withstand internal pressures of up to 26,000 PSI, however in the preferred embodiment, the operating pressures of the tester 10 are up to 1,200 PSI.

FIG. 1 shows the four passages of the tester 10. The exhaust passage is located on the backside of the regulator valve pin 22. In the present invention, a bleed passage 14 is used as a bleed valve 21 to bleed pressure gas off of the tester 10 and through the exhaust passage (not shown). The bleed passage 14 and a bleed chamber 13 house a regulator valve pin 22 and a handle 24 for adjusting the position of the regulator valve pin 22.

An exhaust passage is used to exhaust pressurized gas from the tester. The exhaust passage extends from the bleed chamber 13 to the exterior of the tester 10. The use of a bleed valve and exhaust passage is well known by one having ordinary skill in the art. However, in the preferred embodiment, the exhaust passage is designed and configured such that exhausting pressurized gas from the tester 10 and through the exhaust passage simulates the pneumatic discharge action of a marker. This unique design and configuration allows one to perform various diagnostic tests on a marker's air system.

A pressure passage 16 is used to indicate the internal pressure of the tester 10. The pressure passage 16 contains a pressure gauge 26. In the preferred embodiment, the pressure gauge 26 is to have a pressure range of 0 PSI to 1,200 PSI The inlet passage 18 is used to connect the tester 10 to a standard CGA 320 male thread. In the preferred embodiment, the inlet passage 18 is located in axial alignment with the bleed chamber 13 used for the bleed valve. This is designed so that the seat 28 for bleed valve can be inserted through the internal chamber as shown in FIG. 1, although other arrangements of the passages and assembly configurations can be practiced without departing from the scope of the invention. The seat 28, a washer 30, and a jam hex nut 32 are inserted into the internal chamber to maintain the position of the seat 28.

Next, an O-ring 34 and an industry standard CGA 320 fitting 36 are inserted into the inlet passage 18 to be used to connect the tester 10 to a valve or regulator to be tested (not shown). The O-ring 34 is situated on the fitting 36 in a recessed groove 38 before insertion into the inlet passage 18. In the preferred embodiment the fitting 36 has Compressed Gas Association (CGA) 320 male thread for testing secondary regulators and pneumatic valves (not shown). An adapter 40 can also be used that has a ⅛-27 N.P.T. male thread and quick disconnect male end for testing systems that utilize a line or hose assembly connecting it to the pressure vessel/regulator valve assembly.

Further, a safety burst disk 43 is positioned in the safety burst disk passage 20. The safety burst disk 43 is held in position by use of a safety orifice washer 42 and a safety jam hex nut 44. If the pressure in the valve body becomes too great, the safety burst disk 43 will release from the safety burst disk passage 20. When the safety burst disk 43 releases, pressurized gas escapes through the passage 20, reducing the pressure in the internal chamber 12. In accordance with current CGA safety standard recommendations, the burst disk should release at 1.5 times the input pressure rating. For a system in which the input pressure rating is 1,200 PSI, thus the burst disk should release if the input pressure reaches about 1,800 PSI. Additionally, various O-rings (not shown) are used in the passages, as needed, to maintain up to a 1,200 PSI in the internal chamber 12.

Again referring to FIG. 1, the operation of the universal regulator tester 10 of the present invention can be understood. First, the tester 10 must be connected to a pressurized source regulator to be tested (not shown) with the bleed valve 21 in the closed position. Pressurized air enters the tester 10 through either the adapter 40 or the CGA 320 fitting 36 and/or the inlet passage 18.

The pressurized air simultaneously applies pressure to the bleed valve 21, the pressure passage 16, the pressure gauge 26, the safety burst disk passage 20, and the safety burst disk 43. Pressure is maintained within the internal chamber 12 by sealing its escape past the pin 22 and the seat 28. This causes the pressure gauge 26 to read marker system pressure and the user can adjust the pressure of his marker system if he so wishes. Based upon the reading on the pressure gauge 26 and its actions, different diagnostic evaluations could also be made.

Air can be released from the tester 10 by opening the bleed valve 21 allowing air to pass over the pin 22 and the seat 30 and exit through exhaust passages of a predetermined size and length creating a marker discharge simulation. Based on the actions of the pressure gauge 26, diagnostic evaluations can once again be made on the condition of the air system being tested and its overall condition and performance.

As air leaves the tester 10 through the exhaust passage, the exhausted air is directed downward, by the design and contour of the bleed valve 21, along the sides of the tester 10 to prevent harm to the user or surrounding individuals. To stop the flow of pressurized air, the user simply closes the bleed valve 21.

To simulate the cycling of a markers rate of fire, the user can simply open and close the bleed valve 10 rhythmically to emulate the markers cycle rate. Diagnostic readings can once again be taken to make determinations upon the systems condition and performance.

For testing primary systems, the use of the adapter 40 with the CGA 320 male thread is needed as an interface between the system being tested and the tester 10. The adapter 40 allows for a variety of different primary system configurations to be attached to the tester 10. The various adapters can be used in conjunction with the fitting 36 such that the tester 10 is compatible with the fittings utilized with other manufacturers' air systems, making the present invention a universal tester.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

What is claimed is:

1. A universal regulator tester for use on a marker, comprising:

a main body having an internal chamber with a bleed passage, a pressure passage, inlet passage, a safety burst disk passage, and an exhaust, said bleed passage houses a bleed chamber, a bleed valve comprised of a valve pin and a valve handle, and configured such that pressurized air can be exhausted through said bleed chamber and out said exhaust by movement of said valve handle to move said valve pin, said pressure passage houses a pressure gauge for displaying a pressure measurement of said internal chamber, said inlet passage houses a seat, a washer, and a jam hex nut are inserted and configured into said inlet passage and secured within said internal chamber to act as a seat as part of said bleed valve, said inlet passage being sealed by an O-ring and a fitting, said fitting configured for attachment to said marker to be tested, said safety burst disk passage housing a safety burst disk and a safety orifice washer.

* * * * *